(12) United States Patent
Savell et al.

(10) Patent No.: US 6,275,899 B1
(45) Date of Patent: Aug. 14, 2001

(54) METHOD AND CIRCUIT FOR IMPLEMENTING DIGITAL DELAY LINES USING DELAY CACHES

(75) Inventors: Thomas C Savell; Stephen Hoge, both of Santa Cruz, CA (US)

(73) Assignee: Creative Technology, Ltd., Singapore (SG)

( * ) Notice: Subject to any disclaimer, the term of this patent is extended or adjusted under 35 U.S.C. 154(b) by 0 days.

(21) Appl. No.: 09/191,754

(22) Filed: Nov. 13, 1998

(51) Int. Cl.[7] ........................................ G06F 13/00
(52) U.S. Cl. ..................... 711/118; 711/167; 711/137; 365/194; 84/604
(58) Field of Search .................... 711/167, 118, 711/119, 137; 713/401; 84/601, 602, 603, 604, 605; 365/194

(56) References Cited

U.S. PATENT DOCUMENTS

| | | | |
|---|---|---|---|
| 4,757,469 | * 7/1988 | Odijk | 365/194 |
| 5,170,369 | 12/1992 | Rossum | 708/320 |
| 5,248,845 | 9/1993 | Massie et al. | 84/622 |
| 5,303,309 | 4/1994 | Rossum | 381/118 |
| 5,342,990 | 8/1994 | Rossum | 84/603 |
| 5,698,803 | 12/1997 | Rossum | 84/607 |
| 5,698,807 | 12/1997 | Massie et al. | 84/661 |
| 5,740,716 | * 4/1998 | Stilson | 84/661 |
| 5,763,800 | 6/1998 | Rossum et al. | 84/603 |
| 5,781,461 | * 7/1998 | Jaffe et al. | 708/301 |
| 5,864,876 | * 1/1999 | Rossum et al. | 711/206 |
| 5,918,302 | * 6/1999 | Rinn | 84/604 |
| 5,928,342 | * 7/1999 | Rossum et al. | 710/74 |
| 6,032,235 | * 2/2000 | Hoge | 711/156 |

* cited by examiner

*Primary Examiner*—Glenn Gossage
(74) *Attorney, Agent, or Firm*—Kenneth R. Backus, Jr.; Townsend and Townsend and Crew LLP (57) ABSTRACT

A circuit for implementing digital delay lines that includes a main memory, a cache memory, and a processor. The main memory implements at least one digital delay line, as many delay lines as required by a digital signal processing (DSP) program running on the processor, up to a predetermined number. The delay lines contain data samples to be operated on, or produced by DSP program. The cache memory implements a number of delay caches that temporarily store data samples and support the delay lines. Each delay line is associated with a read cache and a write cache. A block of data samples are "pre-fetched" from a delay line in the main memory and provided to the associated read cache. The data samples in the read cache are then accessed, as needed, by the processor. Data samples generated by the DSP program are provided to the write cache. Periodically, a block of data samples is "post-written" from the write cache to its corresponding delay line in the main memory. The delay caches are serviced such that the read caches do not underflow and the write caches do not overflow, thereby effectively "anticipating" data accesses by the processor. In one embodiment of the delay line circuit, each of the delay lines includes a circular buffer. In another embodiment, each of the delay caches has a cache size that is greater than the data transfer size. In yet another embodiment, each delay cache is selected for servicing approximately once every servicing period, wherein the servicing period is approximately B sample periods or less and uses a servicing scheme such as a round robin scheme or a priority scheme.

36 Claims, 6 Drawing Sheets

METHOD AND CIRCUIT FOR IMPLEMENTING DIGITAL DELAY LINES USING DELAY CACHES

BACKGROUND OF THE INVENTION

The present invention relates generally to digital signal processing, and more particularly to method and circuit for implementing digital delay lines that can be used, for example, for audio applications.

Delay lines are commonly used in the electronics art to provide predetermined amounts of delay for signals. The delay facilitates the implementation of many functions and features. For example, in the field of audio signal processing, digital audio delay lines are used to provide echo effects, reverberation effects, distortion effects, three-dimensional (3-D) audio, and environmental modeling.

A digital delay line is conventionally implemented with a block of memory that is accessed using two pointers, a read pointer and a write pointer. The memory block contains data samples. The read and write pointers point to the locations in the delay line containing the current read and write samples, respectively. As a data sample is written to the current location in the delay line, the write pointer is advanced to the next location. Similarly, as a data sample is retrieved from the delay line, the read pointer is advanced to the next data sample. The difference between the read and write pointers represents the signal delay, in sample periods. By adjusting the location of either the read or write pointer, or both, different amounts of delay (albeit in discrete steps) can be obtained.

Many digital signal processing (DSP) algorithms that use digital delay lines require access to the delay lines with minimal latency (or low or near-zero access delay). Typically, a relatively large number of delay lines is needed to support these algorithms. Further, a read and a write access is typically performed for each delay line and for each sample period. These factors necessitate the use of a memory having high bandwidth and low access latency.

To satisfy these memory requirements, one conventional technique utilizes a local memory to implement the delay lines. Each delay line is accessed with individual read and write operations that are separate from those of other delay lines. The local memory is typically directly coupled to a digital signal processor that executes the DSP algorithm. The direct coupling of these circuit elements allows the processor to access the local memory with low latency, on-demand (i.e., as needed by the processor), and on a sample-by-sample basis.

However, as the requirement for local memory increases in size, it becomes less cost effective to use local memory to implement these delay lines. Also, in today's computing environment, commonly used memory devices have high capacity and are relatively inexpensive. Unfortunately, these memory devices are typically coupled to a bus that has high latency. Further, for improved efficiency, the bus typically transfers a block of data at a time. The high latency of the bus, the access latency of the memory device, and the tendency of both to operate in "burst" mode are contrary to the requirements of the DSP algorithms for low-latency, on-demand access to individual samples.

One conventional technique attempts to resolve these disparities by performing a read request of a data sample one sample period in advance of when the data sample is needed and a write request after a write data sample is calculated. These read and write requests are performed as individual (and independent) operations and are, therefore, inefficient. Further, these requests operate on single data sample and, consequently, the design can tolerate only one sample period of latency without producing artifacts (i.e., audible defects). Thus, this technique is only marginally effective at addressing the high-latency and burst characteristics of the bus.

Another conventional technique partially resolves these disparities by employing a small temporary memory. In this technique, a block of data samples from a main memory is provided to the temporary memory during a read operation. When the digital signal processor requests a data sample, the address associated with that data sample is compared with the addresses of the data samples contained in the temporary memory. If the requested data sample resides in the temporary memory, it is returned to the digital signal processor. Otherwise, a request is made to transfer the next block of data samples from main memory to the temporary memory. The improvement provided by the temporary memory alleviates some problems, but this technique is still inefficient (and sometimes ineffective) because of the need to wait for a data transfer across a high latency bus when the requested data sample is not currently available in the temporary memory.

Thus, methods and circuits that efficiently implement digital delay lines, particularly for audio applications, are much needed in the art.

SUMMARY OF THE INVENTION

The invention provides techniques for implementing digital delay lines that are used for various applications, including audio signal processing. A specific embodiment of the invention provides a delay line circuit that includes a main memory, a cache memory, and a signal processor. The cache memory operably couples to the main memory, and the signal processor operably couples to the cache memory.

The main memory implements one or more digital delay lines, as many delay lines as required by a digital signal processing (DSP) program running on the signal processor, up to a predetermined number. The delay lines hold data samples to be operated on, or produced by, the DSP program. Each delay line has a read pointer and a write pointer, with the difference between the read and write pointers corresponding to the amount of delay, in sample periods. The delay lines can be efficiently implemented as circular buffers.

The cache memory implements a number of delay caches that temporarily store data samples and support the delay lines. In one implementation, each delay line is associated with a read cache and a write cache. A block of data samples is "pre-fetched" from a delay line in the main memory and provided to the associated read cache. The data samples in the read cache are then accessed, as needed, by the signal processor. Data samples generated by the DSP program are provided to the write cache. Periodically, a block of data samples is "post-written" from the write cache to its corresponding delay line in the main memory.

Each active delay cache is selected for servicing once every servicing period. Servicing entails performing a data transfer operation between the delay cache and its corresponding delay line. The servicing period is selected based, in part, on the cache size and the number of delay caches. The servicing is further designed such that the read caches do not underflow (i.e., become empty) and the write caches do not overflow (i.e., become full). This design effectively "anticipates" data accesses by the signal processor.

The delay caches can be selected for servicing by the use of a round-robin scheme, a priority scheme, or some other schemes. Further, for some bus implementations, the starting address of the delay line for each data transfer operation is adjusted to more fully utilize the capacity of the bus, as will be explained in greater detail below.

The invention effectively allows the signal processor to have low latency access to individual data samples while experiencing minimal effects from the high-latency, burst characteristics of the bus and main memory.

The foregoing, together with other aspects of this invention, will become more apparent when referring to the following specification, claims, and accompanying drawings.

DESCRIPTION OF THE SPECIFIC EMBODIMENTS

Figure 1:
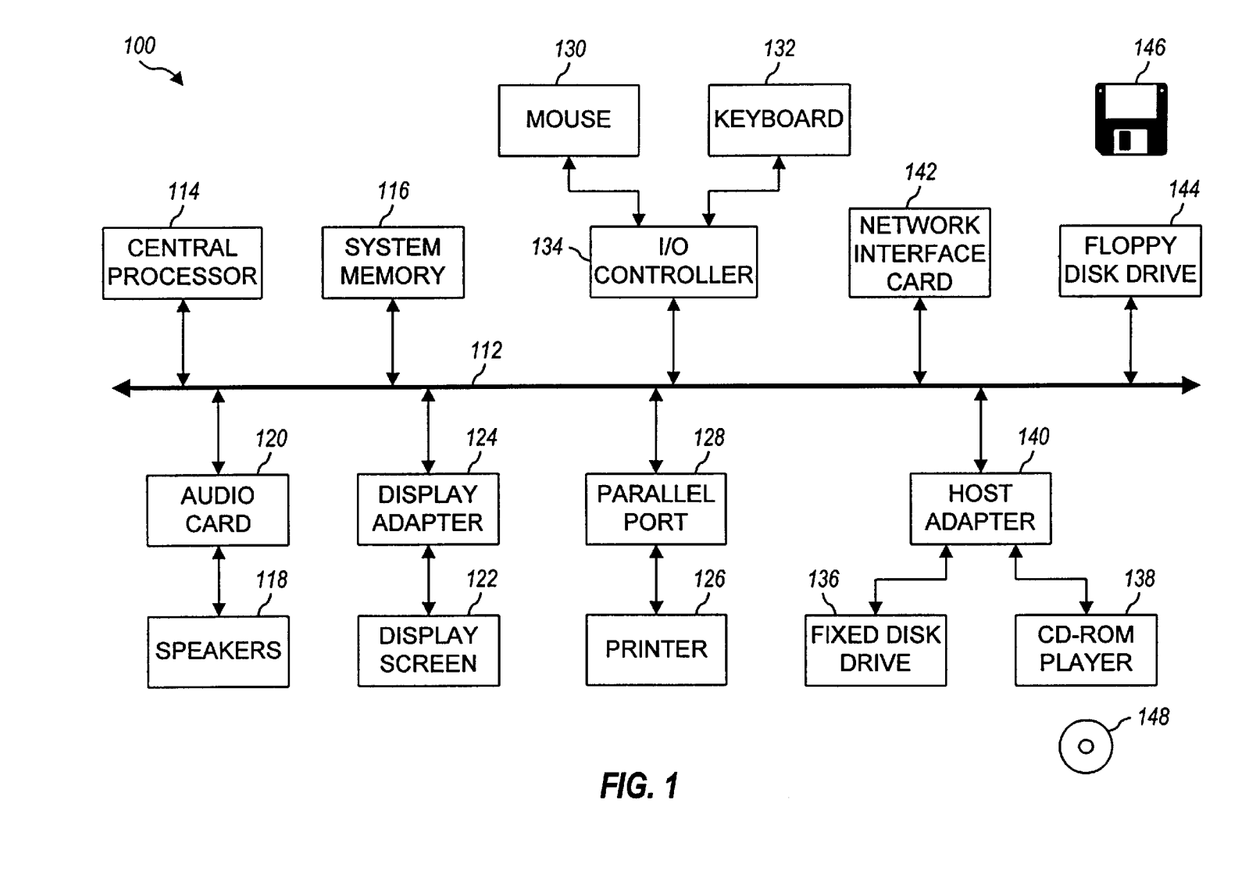
FIG. 1 shows the basic subsystems of a computer system suitable for implementing some embodiments of the invention.

FIG. 1 shows the basic subsystems of a computer system 100 suitable for implementing some embodiments of the invention. In FIG. 1, computer system 100 includes a bus 112 that interconnects major subsystems such as a central processor 114, a system memory 116, and external devices such as speakers 118 via an audio card 120, a display screen 122 via a display adapter 124, a printer 126 via a parallel port 128, a mouse 130 and a keyboard 132 via an input/output (I/O) controller 134, a fixed disk drive 136 and a CD-ROM player 138 via a host adapter 140, a network interface card 142, and a floppy disk drive 144 operative to receive a floppy disk 146.

Many other devices or subsystems (not shown) can be also be connected, such as a scanning device, a touch screen, and others. Also, it is not necessary for all of the devices shown in FIG. 1 to be present to practice the present invention. Furthermore, the devices and subsystems may be interconnected in different configurations than that shown in FIG. 1. The operation of a computer system such as that shown in FIG. 1 is readily known in the art and is not discussed in detail herein. Source code to implement some embodiments of the invention may be operably disposed in system memory 116, located in a subsystem that couples to bus 112 (e.g., audio card 120), or stored on storage media such as fixed disk drive 136, floppy disk 146, or a CD-ROM 148 that is operative with CD-ROM player 138.

Bus 112 can be implemented in various manners. For example, bus 112 can be implemented as a local bus, a serial bus, a parallel port, or an expansion bus (e.g., ADB, SCSI, ISA, EISA, MCA, NuBus, PCI, or other bus architectures). Bus 112 provides high data transfer capability (i.e., through multiple parallel data lines) but is generally characterized by high latency (i.e., long access time). Generally, for high efficiency, bus 112 operates in a "vectorized" or "burst" mode characterized by the grouping of many read or write transactions to (contiguous) memory addresses into a single memory "operation" performed (substantially sequentially) on a "vector" of data. System memory 116 can be a random-access memory (RAM), a dynamic RAM (DRAM), or other memory devices.

Figure 2:
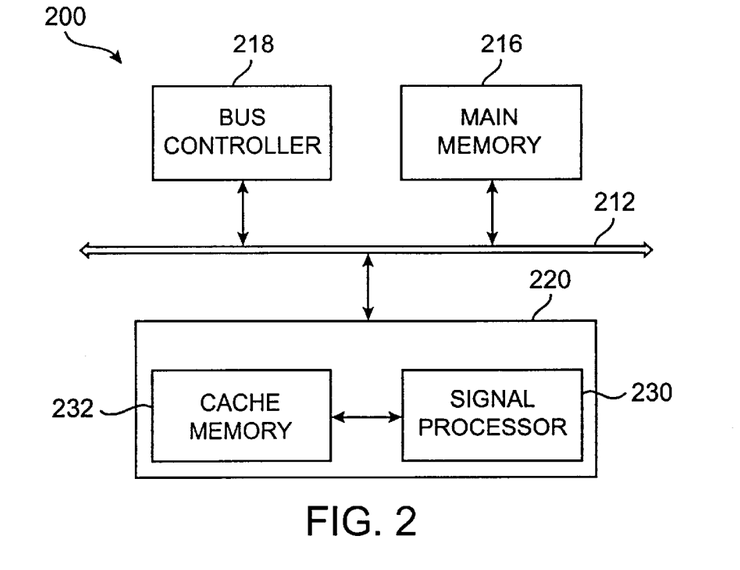
FIG. 2 shows a block diagram of an embodiment of a signal processing system in accordance with one aspect of the invention.

FIG. 2 shows a block diagram of an embodiment of a signal processing system 200 in accordance with one aspect of the invention. Signal processing system 200 can be implemented within computer system 100 shown in FIG. 1, where a bus 212 and a main memory 216 correspond to bus 112 and system memory 116. Signal processing system 200 can also be implemented within a circuit card (e.g., such as audio card 120 in FIG. 1), where bus 212, main memory 216, and a bus controller 218 are elements of the circuit card. Signal processing system 200 can further be implemented within an integrated circuit, such as a microprocessor, a digital signal processor, a microcomputer, an application specific integrated circuit (ASIC), or the like.

Within signal processing system 200, bus 212 interconnects main memory 216, bus controller 218, and a signal processing subsystem 220. Signal processing subsystem 220 includes a signal processor 230 coupled to a cache memory 232. In a specific embodiment, signal processing system 200 is an audio processing system. In this embodiment, signal processing subsystem 220 can further include other circuits such as, for example, a signal mixer and supporting circuitry for a CD input, a line input, a MIC input, and a speaker output.

Cache memory 232 provides a buffer between main memory 216 and signal processor 230. Main memory 216 stores the data samples to be operated on by signal processor 230. However, since bus 212 typically operates in burst mode and has high latency, the data samples are transferred, one block at a time, between main memory 216 and cache memory 232. The data samples in cache memory 232 are more conveniently accessed by signal processor 230. Cache memory 232 is implemented with sufficient size to provide the required functionality, as further described below.

A block diagram of an audio system suitable for implementing some embodiments of the invention is described in U.S. patent application Ser. No. 08/887,362, entited "AUDIO EFFECTS PROCESSOR HAVING DECOUPLED INSTRUCTION EXECUTION AND AUDIO DATA SEQUENCING," filed Jul. 2, 1997, assigned to the assignee of the present application, and incorporated herein by reference. The use of caching at a circuit level in the implementation of digital delay lines is described in U.S. Pat. No. 5,342,990 entitled "DIGITAL SAMPLING INSTRUMENT EMPLOYING CACHE MEMORY," assigned to the assignee of the present invention, and incorporated herein by reference.

Figure 3:
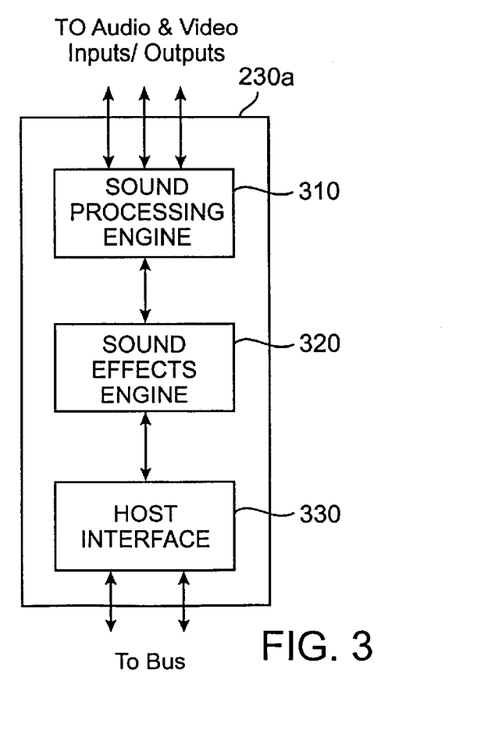
FIG. 3 shows a simplified block diagram of a signal processor used for audio processing.

FIG. 3 shows a simplified block diagram of a signal processor 230a used for audio processing. Signal processor 230a can implement signal processor 230 in FIG. 2. Signal processor 230a includes three primary functional units: a sound processing engine 310, a sound effects engine 320, and a host interface unit 330. Sound processing engine 310 can include, for example, a 64-voice wavetable synthesizer and 16 summing effects buses. Each of the 64 voice channels can be routed, at its respective programmable amplitude, to an arbitrary selection of four of these buses.

Sound effects engine 320 receives input from sound processing engine 310 and from additional audio inputs (not shown) such as CD Audio, ZVideo, a microphone jack, a stereo input and an auxiliary S/PDIF input, among others. Sound effects engine 320 includes functional units to execute signal processing instructions from a digital signal processing (DSP) program. Host interface unit 330 interfaces sound effects engine 320 with a host processor (e.g., central processor 114 in FIG. 1) using, for example, a PCI protocol. Although not shown in FIG. 3, signal processor 230a can also include a memory element for storing, for example, source code that directs the operation of the functional units within signal processor 230a.

Signal processor 230a is described in greater detail in the aforementioned U.S. patent application Ser. No. 08/887,362. Details of the functional units of signal processor 230a are also set forth in U.S. Pat. No. 5,928,342, entitled "AUDIO EFFECTS PROCESSOR INTEGRATED ON A SINGLE CHIP WITH A MULTIPORT MEMORY ONTO WHICH MULTIPLE ASYNCHRONOUS DIGITAL SOUND SAMPLES CAN BE CONCURRENTLY LOADED,"the assignee of the present invention, and herein incorporated by reference.

Figure 4:
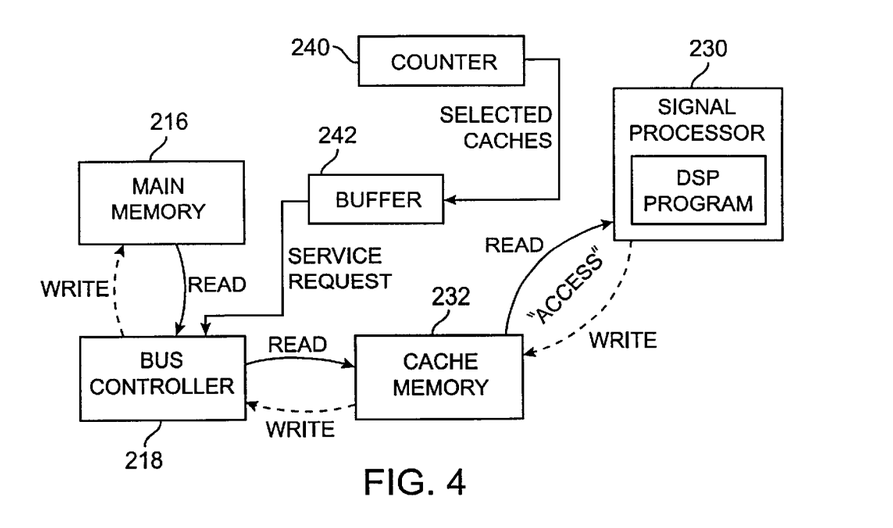
FIG. 4 shows the interaction between the signal processor, the main memory, and the cache memory.

FIG. 4 shows the interaction between signal processor 230, main memory 216, and cache memory 232. Signal processor 230 executes the DSP program that implements algorithms that produce the desired effects. For example, for audio processing, the DSP program can generate echo effects, reverberation effects, distortion effects, 3-D audio, environmental modeling, and others. The DSP program operates on data samples that (originally) reside within main memory 216. The DSP program also provides data samples to be stored to main memory 216. However, because of the high latency and burst characteristics of the data transfer to and from main memory 216, the data samples are temporarily stored in intermediate cache memory 232. For a read access of a data sample by the DSP program, the data sample is retrieved from cache memory 232. Periodically, the contents of cache memory 232 are replenished by performing a read operation from main memory 216. Similarly, for a write access of a data sample by the DSP program, the data sample is stored to cache memory 232, and the contents of cache memory 232 are periodically transferred to main memory 216 by performing a write operation. For clarity, as used herein, read and write "accesses" refer to the data transfer between signal processor 230 and cache memory 232, and read and write "operations" refer to the data transfer between cache memory 232 and main memory 216.

Cache memory 232 provides an interface between main memory 216 and signal processor 230. Cache memory 232 bridges the gap between the high-latency, block data transfer characteristics (i.e., of a typical computer system) and the low-latency, single data sample access requirements of the DSP program.

To efficiently utilize bus 212 (with its relatively high latency), the read and write operations are "vectorized" such that a block of B data samples are read from, or written to main memory 216 in a single transaction. Data samples required by signal processor 230 are "pre-fetched," a block at a time, from main memory 216 and temporarily stored in cache memory 232. Similarly, data samples generated by signal processor 230 are stored to cache memory 232 and subsequently "post-written," a block at a time, to main memory 216. Cache memory 232 provides low-latency access to data samples, on-demand as they are need by the DSP program, and on individual samples.

In some embodiments of the invention, the "pre-fetch" is possible because the data "usage" is deterministic, and it is possible to know a priori which data samples will be needed in the future. In some other embodiments, the data samples needed in the future can be predicted or estimated. Thus, the data accesses by the processor are effectively "anticipated." The invention is an improvement over conventional caches that are not able to pre-fetch data because the accessed data is not deterministic.

Figure 5A:
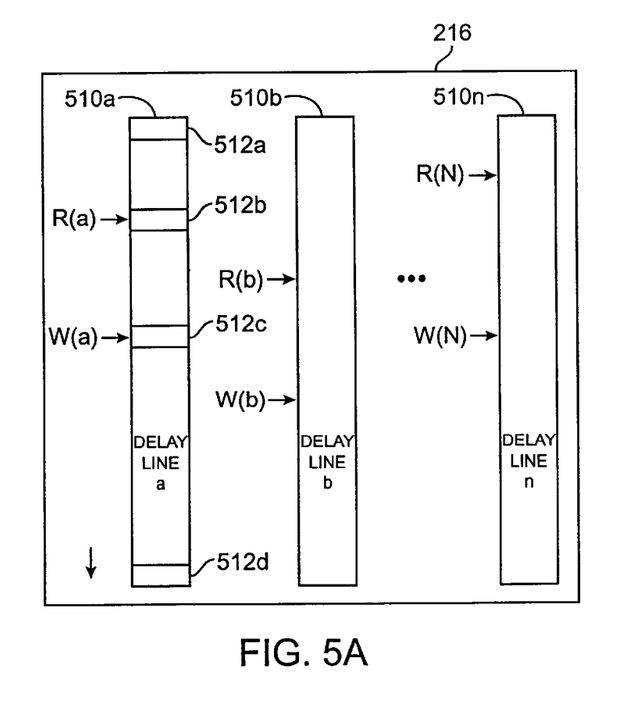
FIG. 5A shows a diagram of an implementation of multiple delay lines within the main memory.

FIG. 5A shows a diagram of an implementation of multiple delay lines 510 within main memory 216. As shown, main memory 216 implements N delay lines 510a through 510n. The number of delay lines is dependent on the requirements set by the DSP program being executed by signal processor 230 and by the memory block available to implement the delay lines. This number can by static, or can dynamically change (i.e., during execution of the DSP program). In one specific embodiment, main memory 216 implements 16 delay lines 510 (N=16).

Main memory 216 is typically a large block of memory, a section of which is allocated to implement as many delay lines 510 (up to a predetermined number of delay lines) as required by the particular DSP program. Each delay line 510 is implemented with a (preferably contiguous) block of memory within main memory 216. The delay lines can have identical length or different lengths, again depending on the requirements set forth by the DSP program. The delay lines can also be arranged such that they are implemented consecutively, however, this is not necessary.

Each delay line 510 is associated with a corresponding set of read and write pointers, R(n) and W(n), respectively. The pointers for each delay line 510 can be implemented independently of those of other delay lines within main memory 216. Alternatively, a set of delay lines 510 can share the same read and/or write pointers.

In an embodiment, each delay line 510 is efficiently implemented as a circular buffer. In one implementation, the read and write pointers move downward in the memory (as indicated by the down arrow) and (approximately) point to the current locations of the read and write data samples, respectively. For example, read pointer R(a) points to a memory location 512b holding the next data sample to be read from delay line 510a, and write pointer W(a) points to a memory location 512c that will store the next data sample to be written to delay line 510a. The read and write pointers for the delay lines are maintained by a memory address unit that can reside within bus controller 218 or signal processing subsystem 220 (see FIG. 2), or some other circuit elements not shown in FIG. 2.

For each read (or write) operation, the data samples are read from (or written to) main memory 216 starting at the memory location pointed to by the read (or write) pointer. Upon completion of the read (or write) operation, the pointer is advanced to the final memory location, which is determined based on the number of data samples read from (or written to) main memory 216. For a circular buffer implementation, when a pointer reaches the bottom of the delay line (e.g., memory location 512d), it is advanced to the top of the delay line (e.g., memory location 512a). The difference between the read pointer R(n) and the write pointer W(n) represents the delay of the delay line. More delay can be obtained by further separating the read and write pointers.

The implementation of delay line 510 as a circular buffer is described in further detail in the aforementioned patent application Ser. No. 08/887,362. A method and circuit that initialize a memory, such as delay lines 510 within main memory 216, and indicate when valid data is available from the memory are described in U.S. Pat. No. 6,032,325, entitled "MEMORY INITIALIZATION CIRCUIT," filed Nov. 14, 1998, assigned to the assignee of the present invention, and incorporated herein by reference.

Figure 5B:
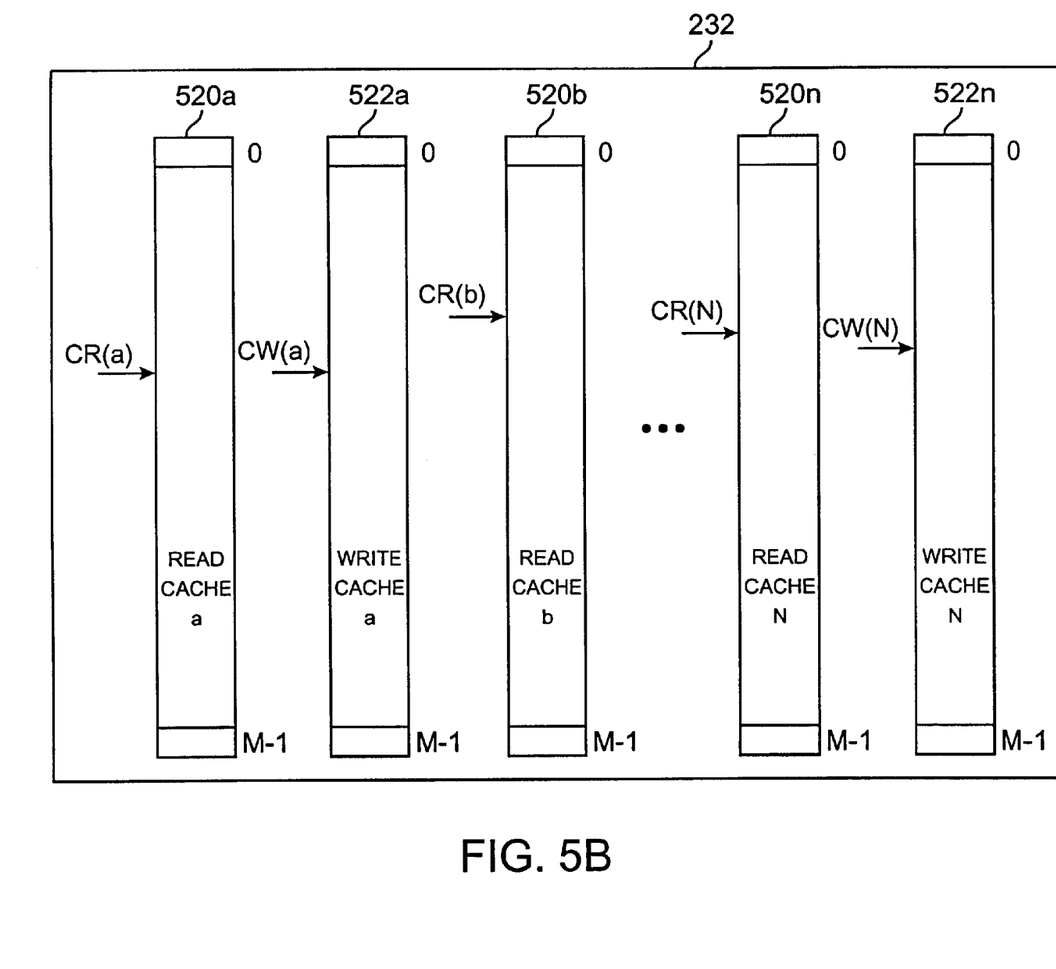
FIG. 5B shows a diagram of an implementation of multiple delay caches within the cache memory.

FIG. 5B shows a diagram of an implementation of multiple delay caches within cache memory 232. A delay cache can be either a read cache for storing data samples to be retrieved by the DSP program or a write cache for storing data samples generated by the DSP program. In one embodiment, cache memory 232 implements N read caches 520a through 520n and N write caches 522a through 522n. In this embodiment, two delay caches, one read cache 520 and one write cache 522, support each delay line 510. As shown in FIG. 5B, each delay cache has a length of M data samples. However, the delay caches can have different lengths, and this is within the scope of the invention. Further, multiple read and/or write caches can also be associated with each delay line.

Each read cache 520 is associated with a cache read pointer, CR(n). Similarly, each write cache 522 is associated with a cache write pointer, CW(n). The pointer for each delay cache can be implemented independently of those of other (similar typed) delay caches within cache memory 232. Alternatively, a set of delay caches can implement their pointers as offsets from a common counter that advances at a desired rate. This situation can occur if, for example, the DSP program consistently writes to, or reads from, multiple delay caches at similar rates.

To ensure that the DSP program has low-latency access to the data samples in delay caches 520 and 522, as the data samples are needed, each delay cache is implemented with a cache size (M) that is larger than the block data transfer size (B), or M>B. This selection of cache size reduces noticeable artifacts due to the high-latency of bus 212 and main memory 216.

The 2N delay caches 520 and 522 that support the N delay lines 510 are serviced periodically so that they do not overflow or underflow. The delay caches can be serviced by using a round-robin scheme where each delay cache is selected for servicing once every servicing interval. The servicing interval is selected to be approximately the data transfer size (B), or possibly shorter or longer depending on, for example, the number of active delay caches, wherein the servicing interval, or servicing period, is selected based on the data transfer size (B samples). Since one sample is used in either a read or write operation during each sample period, B samples are transferred every B sample periods. The data transfer size is selected based on the delay cache size of M samples such that the data transfer operation is requested a number of sample periods before a read delay cache is empty or a write delay cache is full. The number of sample periods, and thus the number of samples prior a cache being empty or full is, for example, equivalent to M minus B. Alternatively, the delay caches can also be selected for servicing by using a priority scheme. As an example, a priority scheme can select for servicing the read cache nearest to becoming empty and the write cache nearest to becoming full. As another example, a priority scheme can select for servicing the read or write cache anticipated to be most in need of servicing.

In some system designs, the width of bus 212 is not the same as the width of the data samples. For example, a PCI bus is 32 bits in width and most audio applications operate on 16-bit data samples. When the bus and data widths are different, the addressing of the block of data to be transferred between main memory 216 and cache memory 232 can be adjusted to efficiently utilize the bus, as further explained below.

Figure 6A:
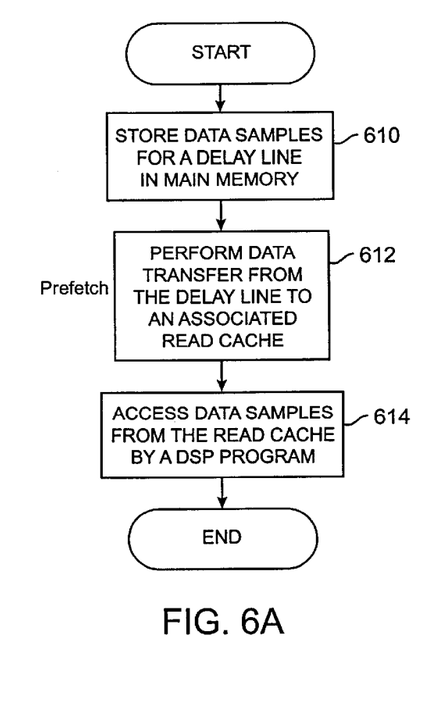
FIG. 6A shows a flow diagram for a read operation of a digital delay line.

FIG. 6A shows a flow diagram for a read operation of a digital delay line such as, for example, a digital audio delay line. At a step 610, the data samples for a particular delay line are stored in a main memory. This can be achieved by another process or by a previous write operation. At a step 612, a data transfer (i.e., a "pre-fetch" operation) is performed for a block of data samples from the delay line to an associated read cache in the cache memory. This data transfer operation is performed approximately once every servicing period. The data samples from the read cache are accessed, at a step 614, in accordance with instructions from the DSP program.

Figure 6B:
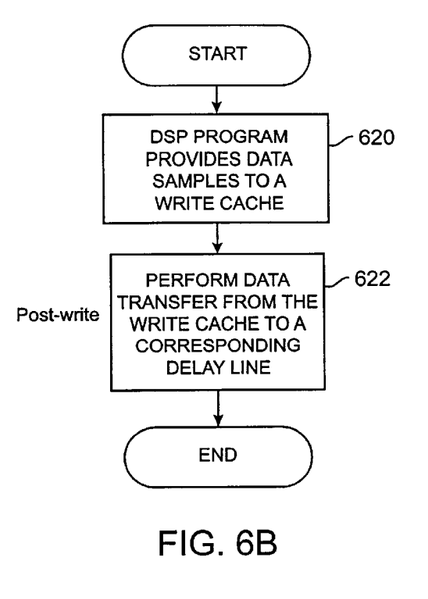
FIG. 6B shows a flow diagram for a write operation of a digital delay line.

FIG. 6B shows a flow diagram for a write operation of the digital delay line. At a step 620, the data samples are provided by the DSP program to a write cache. At a step 622, a data transfer (i.e., a "post-write" operation) is performed for a block of data samples from the write cache in the cache memory to a corresponding delay line. These data samples can be subsequently retrieved by the signal processor through a read operation, as described above.

Figure 7:
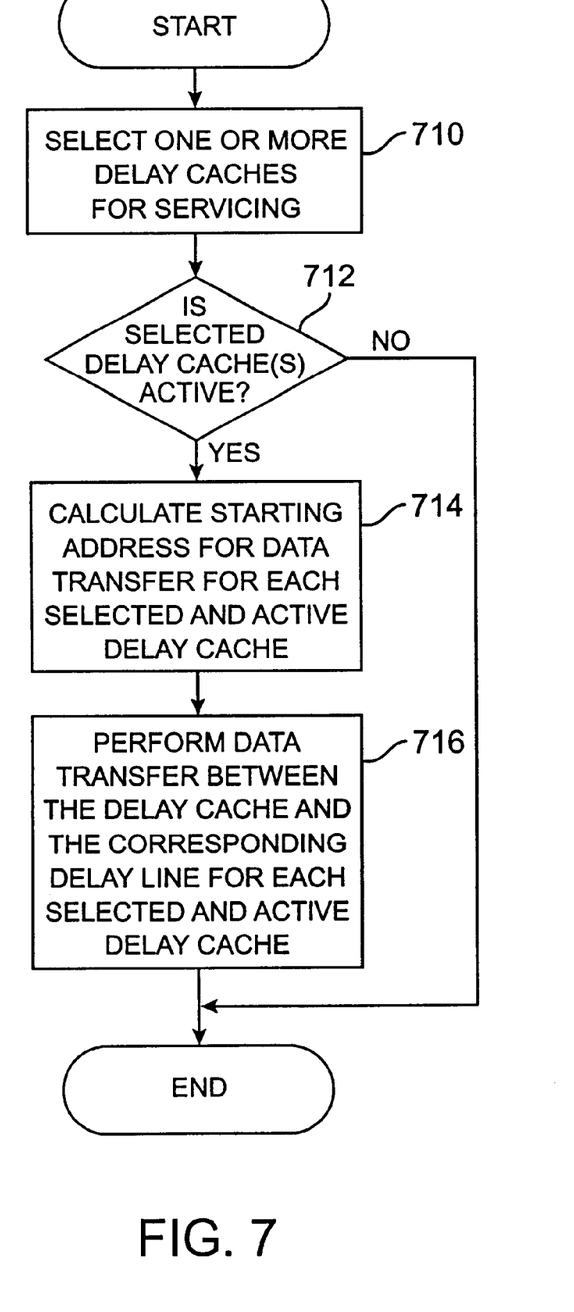
FIG. 7 shows a flow diagram for servicing a delay cache that supports a delay line.

FIG. 7 shows a flow diagram for servicing a delay cache that supports a delay line. This servicing can be used in performing steps 612 and 622 described above in reference to FIGS. 6A and 6B, respectively. At a step 710, one or more delay caches from among a number of delay caches is selected for servicing. The delay cache(s) can be selected based on a round-robin scheme, a priority scheme, or other schemes. At a step 712, a determination is made whether the selected delay cache(s) is active. If the selected delay cache(s) is inactive, no data transfer operation is performed. Otherwise, if the selected delay cache(s) is active, for each selected and active delay cache, the starting address of the corresponding delay line for the data transfer operation is calculated, at a step 714. The calculation can be based, in part, on the data transfer size and the characteristics (i.e., the latency and the bus width) of the hardware associated with the data transfer. For each selected and active delay cache, the data transfer operation between the delay cache and the corresponding delay line is then performed, at a step 716, for a block of data samples. In a specific embodiment, each read or write operation is performed for an identical number of data samples.

A Specific Embodiment of the Invention

A specific embodiment of the invention is described in detail to more clearly recite the invention. In this specific embodiment, the bus is 32 bits in width, the data samples are 16 bits in width, and the data transfer size between the main memory and the cache memory is 16 data samples in length. The main memory implements 16 delay lines, and the cache memory implements 32 delay caches. Each delay cache is designed with a length of 18 samples, or two samples larger than the data transfer size. The extra two samples in the cache size (over the data transfer size) allow the delay caches to tolerate a memory access latency (i.e., due to the bus or the main memory) of up to two full sample periods.

Since the data transfer size is 16 samples, each delay cache is selected for servicing once every approximately 16 sample periods. For example, a read operation is performed for each active read cache every 16 sample periods to "pre-fetch" approximately 16 data samples from a delay line in the main memory corresponding to that read cache. Similarly, a write operation is performed for each active write cache once every 16 sample periods to "post-write" approximately 16 data samples from the write cache to the corresponding delay line.

Since there are 32 delay caches and each delay cache is selected for servicing approximately every 16 sample periods, two delay caches are selected for servicing every sample period. In one implementation, the delay caches are selected for servicing using a round-robin scheme where two delay caches are examined during each sample period to determine if they are active (i.e., either reading or writing). The round-robin scheme can be implemented by identifying each delay cache with a unique number, and selecting two delay caches for servicing during each sample period. For example, the delay caches can be numbered consecutively from 0 to 31. A 4-bit counter maintains a count value of 0 through 15. The counter is updated for each sample period, and the value in the counter identifies the delay caches to be selected for servicing for that particular sample period. Referring back to FIG. 4, an exemplary counter is shown in one embodiment of the invention where the counter 240 is configured to provide the selected delay caches for servicing to, for example, a buffer 242. For example, a count value of 0 can indicate that delay caches 0 and 1 are to be selected for servicing, a count value of 1 can indicate that delay caches 2 and 3 are to be selected for servicing, and so on. In this implementation, when the count value equals the four most significant bits (MSBs) of the identifying number of the delay cache, that delay cache is selected for servicing.

If a delay cache is selected for servicing, and if the selected delay cache is active, a data transfer of a block of data samples is performed for that delay cache. For each data transfer, the starting address of the delay line is determined.

As noted above, for this specific embodiment, the bus width and the sample width are not equal. To efficiently utilize the full capacity of the bus, a scheme can be used where the data samples are pre-fetched from, or post-written to, the delay lines in main memory starting (only) at even addresses. This addressing scheme is further explained for a PCI bus implementation. The PCI bus allows for data transfer in bursts and includes hardware that facilitates the data transfer. For example, the PCI bus includes address circuitry that receives a starting address and generates the required memory addresses during a data transfer operation. The address circuitry includes a counter that starts at the given starting address and increments the address with each clock cycle. The PCI bus thus burst in a positive direction for both read and write operations.

Accordingly, for each data transfer operation, the starting address corresponding to the lowest memory location of the block of data to be transferred is provided to the PCI address circuitry. Because the delay line is implemented as a circular buffer with addressing that proceeds downward (see FIG. 5) and the PCI addressing increments upward, the starting address is adjusted by either −17 or −18 data samples for a read operation. For a write operation, the starting address is adjusted by either 0 or +1 data samples. The reason for the uncertainty of one data sample for both read and write operations is because the current address can be an odd or even address, and it is desirable (for efficient use of the PCI bus) to address the delay line starting (only) at even addresses. Thus, if the current address is at an odd address, as indicated by the LSB being equal to one, the adjustment is an odd number (e.g., −17 for read operation and +1 for write operation) to provide an even starting address. Similarly, if the current address is at an even address, as indicated by the LSB being equal to zero, the adjustment is an even number (e.g., −18 for read operation and 0 for write operation), again to provide an even starting address. This adjustment aligns the data transfer to a 32-bit boundary of the PCI bus. This also explains the earlier statement that the read and write pointers point to the (approximate) memory locations of the current read and write data samples, respectively, in the delay line.

Obviously, for other implementations of the delay line (i.e., a circular addressing that proceeds upward instead of downward), or different data transfer sizes, or different bus addressing schemes (i.e., one that decrements as oppose to one that increments), the address adjustment is still performed, but perhaps in a different manner.

As described above, the selection of a cache size of 18 samples and a data transfer size of 16 samples affords tolerance of a bus (plus memory access) latency of up to two sample periods. Each delay cache is selected for servicing once every servicing period of 16 sample periods. Since there are 32 delay caches and each is selected for servicing every 16 sample periods, two delay caches are selected for servicing at each sample period. Thus, up to four cache service requests can be queued up at any given moment.

Multiple service requests can be supported by the use of a first-in, first-out (FIFO) buffer that temporarily stores information associated with the service requests. For example, a 4-deep FIFO can store up to four service requests at any given moment. When the service request at the top of the FIFO buffer is completed, the other requests within the FIFO buffer advance. In one embodiment of the invention, as shown in FIG. 4, an exemplary buffer 242 is configured to store servicing information in buffer 242 and is configured to provide one or more service requests to, for example, a bus controller 218. In one implementation, if the FIFO buffer is full when an active delay cache is selected for servicing, that service request is ignored (and that delay cache waits for an additional 16 sample periods before being selected for servicing again). A cache size larger than 18 samples (relative to a data transfer size of 16 samples) would afford tolerance of a greater amount of latency. A FIFO buffer larger than 4-deep, or a servicing scheme more intelligent than the simple round-robin scheme, or both, would also avoid or minimize instances where a service request is ignored.

The previous description of the specific embodiments is provided to enable any person skilled in the art to make or use the invention. The various modifications to these embodiments will be readily apparent to those skilled in the art, and the generic principles defined herein may be applied to other embodiments without the use of the inventive faculty. For example, the techniques described above can be applied to the implementation of digital audio delay lines, digital video delay lines, and other delay lines. Thus, the invention is not intended to be limited to the embodiments shown herein but is to be accorded the widest scope consistent with the principles and novel features disclosed herein, and as defined by the following claims.

What is claimed is:

1. A delay line circuit comprising:
   a main memory including at least one digital delay line, each delay line having respective read and write pointers;
   a cache memory operably coupled to the main memory to perform a pre-fetch data transfer operation from the main memory to the cache memory having a data transfer size of approximately B data samples, where B is greater than two and the cache memory includes a plurality of delay caches; and a processor operably coupled to the cache memory, where the cache memory is configured to anticipate an access by the processor such that the cache memory contains a pre-fetched data sample when requested by the processor in a sample period, wherein the processor has access to individual pre-fetched data samples from each active delay cache in the cache memory.

2. The circuit of claim 1 wherein each of the delay lines comprises a circular buffer.

3. The circuit of claim 1 wherein each of the delay caches comprises a cache size that is greater than the data transfer size.

4. The circuit of claim 1 wherein the data transfer size for each data transfer operation is within a range of 15 to 17 data samples.

5. The circuit of claim 1 wherein the data samples are digital representations of audio signals.

6. The circuit of claim 1 wherein the main memory and the cache memory are configured further to perform a post-write data transfer operation to the main memory from the cache memory having a data transfer size of approximately B data samples, where B is greater than two.

7. The circuit of claim 1 wherein at least two delay lines in the main memory share a single write pointer, where the single write pointer is associated with a single write delay cache.

8. The circuit of claim 1 wherein at least two delays line in the main memory share a single read pointer, where the single read pointer is associated with a single read delay cache.

9. The circuit of claim 1 wherein each delay line in the main memory is associated with two delay caches in the cache memory.

10. The circuit of claim 9 wherein the two delay caches includes a read delay cache and a write delay cache.

11. The circuit of claim 1 further comprising:

a bus interposed between the main memory and the cache memory.

12. The circuit of claim 11 wherein the bus is a PCI bus.

13. The circuit of claim 11 wherein each of the delay caches includes a cache size that is selected based, in part, on the data transfer size and a latency of the bus.

14. The circuit of claim 11 wherein a starting address for each data transfer operation is adjusted based on one or more system characteristics that include a width of the bus, a width of the data samples, and the data transfer size.

15. The circuit of claim 1 wherein each delay cache is selected for servicing approximately once every servicing period, wherein the servicing period is approximately B sample periods or less.

16. The circuit of claim 15 wherein the delay caches are selected for servicing using a priority scheme.

17. The circuit of claim 15 wherein the delay caches are selected for servicing using a round-robin scheme.

18. The circuit of claim 17 further comprising:

a counter that advances a count value at each sample period, wherein the count value identifies at least one delay cache to be selected for servicing.

19. The circuit of claim 15 further comprising:

a buffer that stores requests to perform data transfer operations.

20. The circuit of claim 19 wherein the buffer comprises a first-in, first-out (FIFO) buffer.

21. An audio signal processor integrated circuit including a delay line circuit, the delay line circuit comprising:

a main memory including at least one digital delay line, each delay line having respective read and write pointers;

a cache memory operably coupled to the main memory to perform a pre-fetch data transfer operation from the main memory to the cache memory having a data transfer size of approximately B data samples, where B is greater than two and the cache memory includes a plurality of delay caches; and a processor operably coupled to the cache memory, where the cache memory is configured to anticipate an access by the processor such that the cache memory contains a pre-fetched data sample when requested by the processor in a sample period, wherein the processor has access to individual pre-fetched data samples from each active delay cache in the cache memory.

22. The circuit of claim 21 wherein the main memory and the cache memory are configured further to perform a post-write data transfer operation to the main memory from the cache memory having a data transfer size of approximately B data samples, where B is greater than two.

23. An audio circuit board including a delay line circuit, the delay line circuit comprising:

a main memory including at least one digital delay line, each delay line having respective read and write pointers;

a cache memory operably coupled to the main memory to perform a pre-fetch data transfer operation from the main memory to the cache memory having a data transfer size of approximately B data samples, where B is greater than two and the cache memory includes a plurality of delay caches; and a processor operably coupled to the cache memory, where the cache memory is configured to anticipate an access by the processor such that the cache memory contains a pre-fetched data sample when requested by the processor in a sample period, wherein the processor has access to individual pre-fetched data samples from each active delay cache in the cache memory.

24. The circuit of claim 23 wherein the main memory and the cache memory are configured further to perform a post-write data transfer operation to the main memory from the cache memory having a data transfer size of approximately B data samples, where B is greater than two.

25. A computer system including a delay line circuit, the delay line circuit comprising:

a main memory including at least one digital delay line, each delay line having respective read and write pointers;

a cache memory operably coupled to the main memory to perform a pre-fetch data transfer operation from the main memory to the cache memory having a data transfer size of approximately B data samples, where B is greater than two and the cache memory includes a plurality of delay caches; and a processor operably coupled to the cache memory, where the cache memory is configured to anticipate an access by the processor such that the cache memory contains a pre-fetched data sample when requested by the processor in a sample period, wherein the processor has access to individual pre-fetched data samples from each active delay cache in the cache memory.

26. The circuit of claim 25 wherein the main memory and the cache memory are configured further to perform a post-write data transfer operation to the main memory from the cache memory having a data transfer size of approximately B data samples, where B is greater than two.

27. A circuit to implement digital audio delay lines comprising:
- a main memory including a plurality of N digital audio delay lines, each delay line having a read pointer and a write pointer;
- a cache memory operably coupled to the main memory, the cache memory including a plurality of (2N) delay caches, the 2N delay caches having N read delay caches and N write delay caches, wherein one read delay cache and one write delay cache correspond to one delay line, and wherein each delay cache is selected for servicing approximately once every servicing period;
- a bus interposed between the main memory and the cache memory; and
- a processor operably coupled to the cache memory,
- wherein a data transfer operation between a particular delay cache and a corresponding delay line includes a data transfer size of approximately B data samples, wherein the processor has access to individual data samples with each active delay cache in the cache memory, and wherein the servicing period is approximately B sample periods or less.

28. The circuit of claim 27 wherein the data transfer operation between a particular delay cache and a corresponding delay line includes a pre-fetch data transfer operation.

29. The circuit of claim 27 wherein the data transfer operation between a particular delay cache and a corresponding delay line includes a post-write data transfer operation.

30. A method to implement digital audio delay lines comprising:
- storing data samples in at least one digital audio delay line in a main memory;
- performing a pre-fetch data transfer operation of a block of data samples from an active digital audio delay line to an associated delay cache in a cache memory, wherein the data transfer operation is performed approximately once every servicing period; and
- accessing pre-fetched data samples from the associated delay cache in accordance with an algorithm implemented by a digital signal processing (DSP) program.

31. The method of claim 30 further comprising performing a post-write data transfer operation of a block of data samples from an associated delay cache in a cache memory to an active digital audio delay line, wherein the data transfer operation is performed approximately once every servicing period.

32. A method for servicing delay caches that support delay lines comprising:
- selecting at least one delay cache from among a plurality of delay caches for servicing;
- for each selected delay cache, determining whether the delay cache is active;
- for each selected and active delay cache,
  - determining a starting address of the selected and active delay line based on a current address and a data transfer size,
  - performing a pre-fetch data transfer operation between the delay cache and the selected and active delay line, wherein the data transfer operation includes a block of data samples equal to the data transfer size; and
  - accessing each of the pre-fetched data samples where the delay cache contains the pre-fetched data samples when requested in a sample period.

33. The method of claim 32 wherein the selecting is performed using a round-robin scheme.

34. The method of claim 32 wherein the selecting is performed using a priority scheme.

35. The method of claim 32 wherein the delay caches are each selected for servicing once every servicing interval, and wherein the servicing interval is selected based, in part, on the data transfer size and sizes of the delay caches.

36. The method of claim 32 wherein the delay caches include read caches and write caches, and wherein the read caches are selected for servicing before becoming empty and the write caches are selected for servicing before becoming full.

* * * * *